US010107655B2

(12) United States Patent
Wilson et al.

(10) Patent No.: US 10,107,655 B2
(45) Date of Patent: *Oct. 23, 2018

(54) SYSTEMS AND METHODS OF DEVICE-FREE MOTION DETECTION AND PRESENCE DETECTION

(71) Applicant: XANDEM TECHNOLOGY, LLC, Salt Lake City, UT (US)

(72) Inventors: Anthony Joseph Wilson, Holladay, UT (US); Neal K. Patwari, Salt Lake City, UT (US)

(73) Assignee: XANDEM TECHNOLOGY, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,737

(22) Filed: Sep. 6, 2016

(65) Prior Publication Data

US 2017/0131125 A1 May 11, 2017

Related U.S. Application Data

(63) Continuation of application No. 14/212,447, filed on Mar. 14, 2014, now Pat. No. 9,459,125, which is a
(Continued)

(51) Int. Cl.
*G08B 1/08* (2006.01)
*G01D 21/00* (2006.01)
(Continued)

(52) U.S. Cl.
CPC ........... *G01D 21/00* (2013.01); *G01V 11/002* (2013.01); *G08B 13/187* (2013.01); *G08B 21/22* (2013.01);
(Continued)

(58) Field of Classification Search
CPC ....... H04W 4/02; H04W 12/12; H04W 16/20; H04W 24/00; H04W 48/04;
(Continued)

(56) References Cited

U.S. PATENT DOCUMENTS 3,163,861 A 12/1964 Suter
6,839,560 B1 * 1/2005 Bahl .................... G01C 21/206
342/450

(Continued)

OTHER PUBLICATIONS

Wilson, Joey et al, "Through-Wall Tracking Using Variance-Based Radio Tomography Networks," <http://arXiv.org/abs/0909.5417>, Sep. 29, 2009, 9 pgs.

(Continued)

*Primary Examiner* — Daniel Previl
(74) *Attorney, Agent, or Firm* — Stoel Rives, LLP; R Whitney Johnson

(57) ABSTRACT

Systems and methods are provided for device-free motion detection and presence detection within an area of interest. A plurality of nodes, configured to be arranged around the area of interest, form a wireless network. The plurality of nodes transmit wireless signals as radio waves and receive transmitted wireless signals. The received signal strength (RSS) of the transmitted wireless signals between the plurality of nodes are measured and a value is reported. A computing device receives the reported values for the measured RSS and tracks the reported values over time. The computing device processes the reported values using an aggregate disturbance calculation to detect motion and presence within the area of interest. The computing device may notify notification device of a detected disturbance within the area of interest.

20 Claims, 14 Drawing Sheets

Related U.S. Application Data continuation of application No. 13/324,793, filed on Dec. 13, 2011, now Pat. No. 8,710,984.

(60) Provisional application No. 61/422,539, filed on Dec. 13, 2010.

(51) Int. Cl.
*H04W 24/08* (2009.01)
*H04W 24/10* (2009.01)
*G08B 13/187* (2006.01)
*G08B 21/22* (2006.01)
*G01V 11/00* (2006.01)
*H04W 84/18* (2009.01)

(52) U.S. Cl.
CPC ............ *H04W 24/08* (2013.01); *H04W 24/10* (2013.01); *H04W 84/18* (2013.01)

(58) Field of Classification Search
CPC ...... H04W 52/246; A61B 5/00; A61B 5/0002; A61B 5/411; A61B 5/6824; A61B 5/746; A61B 5/7465; H03M 1/201; H03M 3/332; H03M 3/396
USPC .......... 340/539.23, 541, 571, 552, 555, 565, 340/567, 539.21, 542, 545.3, 551, 568.1
See application file for complete search history.

(56) References Cited

U.S. PATENT DOCUMENTS

| | | | |
|---|---|---|---|
| 7,027,992 B2 | 4/2006 | Zaccaria et al. | |
| 7,251,457 B1* | 7/2007 | Davi | H04K 3/43 370/328 |
| 7,800,496 B2 | 9/2010 | Albert et al. | |
| 7,856,209 B1* | 12/2010 | Rawat | G01S 5/02 370/338 |
| 8,031,727 B2 | 10/2011 | Ishii | |
| 8,710,984 B2 | 4/2014 | Wilson et al. | |
| 2002/0027896 A1 | 3/2002 | Hughes et al. | |
| 2003/0146835 A1* | 8/2003 | Carter | G01S 5/0036 340/539.13 |
| 2005/0055568 A1* | 3/2005 | Agrawala | G07C 9/00111 726/2 |
| 2006/0217132 A1* | 9/2006 | Drummond-Murray | H04W 64/00 455/456.2 |
| 2008/0007404 A1 | 1/2008 | Albert | |
| 2010/0026479 A1 | 2/2010 | Tran | |
| 2010/0332889 A1* | 12/2010 | Shneorson | G06Q 10/04 714/2 |
| 2014/0200856 A1 | 7/2014 | Wilson et al. | |

OTHER PUBLICATIONS

Lee, Yang-Han et al, "Application of RSSI on Indoor Security Wireless Network", WNET 2005, <http://www.actapress.com/Content_Of_Proceeding.aspx?ProceedingID=307>, Jul. 19-21, 2005, 3 pgs.

Zhang, Dian et al, "Dynamic Clustering for Tracking Multiple Transceiver-free Objects," Pervasive Computing and Communication, 2009. PerCom 2009. IEEE International Conference on, Mar. 9-13, 2009, 8 pgs.

Zhang, Dian et al, "An RF-Based System for Tracking Transceiver-Free Objects," Fifth IEEE International Conference on Pervasive Computing and Communications (PerCom '07), <http://www.computer.org/portal/web/csdl/doi/10.1109/PERCOM.2007.8>, Mar. 19-23, 2007, 10 pgs.

Nakatsuka, M. et al, "A Study on Passive Crowd Density Estimation Using Wireless Sensors," The 4th Intl Conf on Mobile Computing and Ubiquitous Networking ICMU 2008 (2008), <http://www.mendeley.com/research/study-passive-crowd-density-estimation-using-wireless-sensors/>, 2008, 6 pgs.

Youssef, Moustafa et al, "Challenges: Device-free Passive Localization for Wireless Environments," MobiCom '07 Proceedings of the 13th Annual ACM International Conference on Mobile Computing and Networking, Sep. 2007, pp. 222-229.

Cover, Mathew B., et al, "Microwave Tomography Using Dynamic 802.15.4 Wireless Networks," Electro/Information Technology, 2007 IEEE International Conference on, May 17-20, 2007, 6 pgs.

Woyach, Kristen et al, "Sensorless Sensing in Wireless Networks: Implementation and Measurements," In Proceedings of the Second Workshop on Wireless Network Measurements (WiNMee 2006), Boston, MA, USA, Apr. 2006, 8 pgs.

Wilson, Joey et al, "Radio Tomographic Imaging with Wireless Networks," Tech Report, Sep. 16, 2008, 13 pgs.

Wilson, Joey et al, "Regularization Methods for Radio Tomographic Imaging," In Proceedings of the 2009 Virginia Tech Wireless Symposium, Blacksburg, VA, Jun. 2009, 9 pgs.

Wilson, Anthony Joseph, "Device-Free Localization With Received Signal Strength Measurements in Wireless Networks," Dissertation Submitted to the Faculty of the University of Utah, Department of Electrical and Computer Engineering, Aug. 2010, 161 pgs.

International Search Report and Written Opinion for PCT/US2011/064678 filed Dec. 13, 2011, dated Apr. 24, 2012.

Non-final Office Action from USPTO for U.S. Appl. No. 13/324,793 dated Jul. 25, 2013.

Non-final Office Action from USPTO for U.S. Appl. No. 14/212,447 dated Jan. 22, 2016.

* cited by examiner

|                      | Transmitting node |       |       |
|----------------------|-------------------|-------|-------|
|                      | $n_1$             | $n_2$ | $n_3$ |
| RSS/LQI Vector of $n_1$  | -                 |       |       |
| RSS/LQI Vector of $n_2$  | -30               | -     |       |
| RSS/LQI Vector of $n_3$  | -62               |       | -     |

Time = $t_1$
k = 1

FIG.10A

|                       | Transmitting node |       |       |
|-----------------------|-------------------|-------|-------|
|                       | $n_1$             | $n_2$ | $n_3$ |
| RSSI/LQI Vector of $n_1$  | -                 | -31   |       |
| RSSI/LQI Vector of $n_2$  | -30               | -     |       |
| RSSI/LQI Vector of $n_3$  | -62               | -66   | -     |

Time = $t_2$
k = 2

FIG. 10B

|                       | Transmitting node |       |       |
|-----------------------|-------------------|-------|-------|
|                       | $n_1$             | $n_2$ | $n_3$ |
| RSSI/LQI Vector of $n_1$  | -                 | -31   | -60   |
| RSSI/LQI Vector of $n_2$  | -30               | -     | -65   |
| RSSI/LQI Vector of $n_3$  | -62               | -66   | -     |

Time = $t_3$
k = 3

FIG. 10C

|  | Transmitting node | | |
|---|---|---|---|
|  | $n_1$ | $n_2$ | $n_3$ |
| RSS/LQI Vector of $n_1$ | - | -31 | -60 |
| RSS/LQI Vector of $n_2$ | -25 | - | -65 |
| RSS/LQI Vector of $n_3$ | -68 | -66 | - |

Time = $t_4$ k = 1

FIG. 10D

|  | Transmitting node | | |
|---|---|---|---|
|  | $n_1$ | $n_2$ | $n_3$ |
| RSSI/LQI Vector of $n_1$ | - | -26 | -60 |
| RSSI/LQI Vector of $n_2$ | -25 | - | -65 |
| RSSI/LQI Vector of $n_3$ | -68 | -77 | - |

Time = $t_5$ k = 2

FIG. 10E

|  | Transmitting node | | |
|---|---|---|---|
|  | $n_1$ | $n_2$ | $n_3$ |
| RSSI/LQI Vector of $n_1$ | - | -26 | -69 |
| RSSI/LQI Vector of $n_2$ | -25 | - | -75 |
| RSSI/LQI Vector of $n_3$ | -68 | -77 | - |

Time = $t_6$ k = 3

FIG. 10F

SYSTEMS AND METHODS OF DEVICE-FREE MOTION DETECTION AND PRESENCE DETECTION

RELATED APPLICATIONS

This application is a continuation of U.S. patent application Ser. No. 14/212,447, filed Mar. 14, 2014, and titled "SYSTEMS AND METHODS OF DEVICE-FREE MOTION DETECTION AND PRESENCE DETECTION," which is a continuation of U.S. patent application Ser. No. 13/324,793, filed Dec. 13, 2011, and titled "SYSTEMS AND METHODS OF DEVICE-FREE MOTION DETECTION AND PRESENCE DETECTION," which claims the benefit under 35 U.S.C. § 119(e) of U.S. Provisional Patent Application No. 61/422,539, filed Dec. 13, 2010, and titled "SYSTEMS AND METHODS OF DEVICE-FREE MOTION DETECTION AND PRESENCE DETECTION," each of which is hereby incorporated herein by reference in its entirety.

TECHNICAL FIELD

The present disclosure relates to device-free motion detection and device-free presence detection within an area of interest.

BRIEF DESCRIPTION OF THE DRAWINGS

The written disclosure herein describes illustrative embodiments that are non-limiting and non-exhaustive. Reference is made to certain of such illustrative embodiments that are depicted in the drawings, of which:

FIGS. 10A-10F illustrate an received signal strength indicator (RSSI) or link quality indicator (LQI) vector at various times t.

DETAILED DESCRIPTION OF PREFERRED EMBODIMENTS

Figure 1:
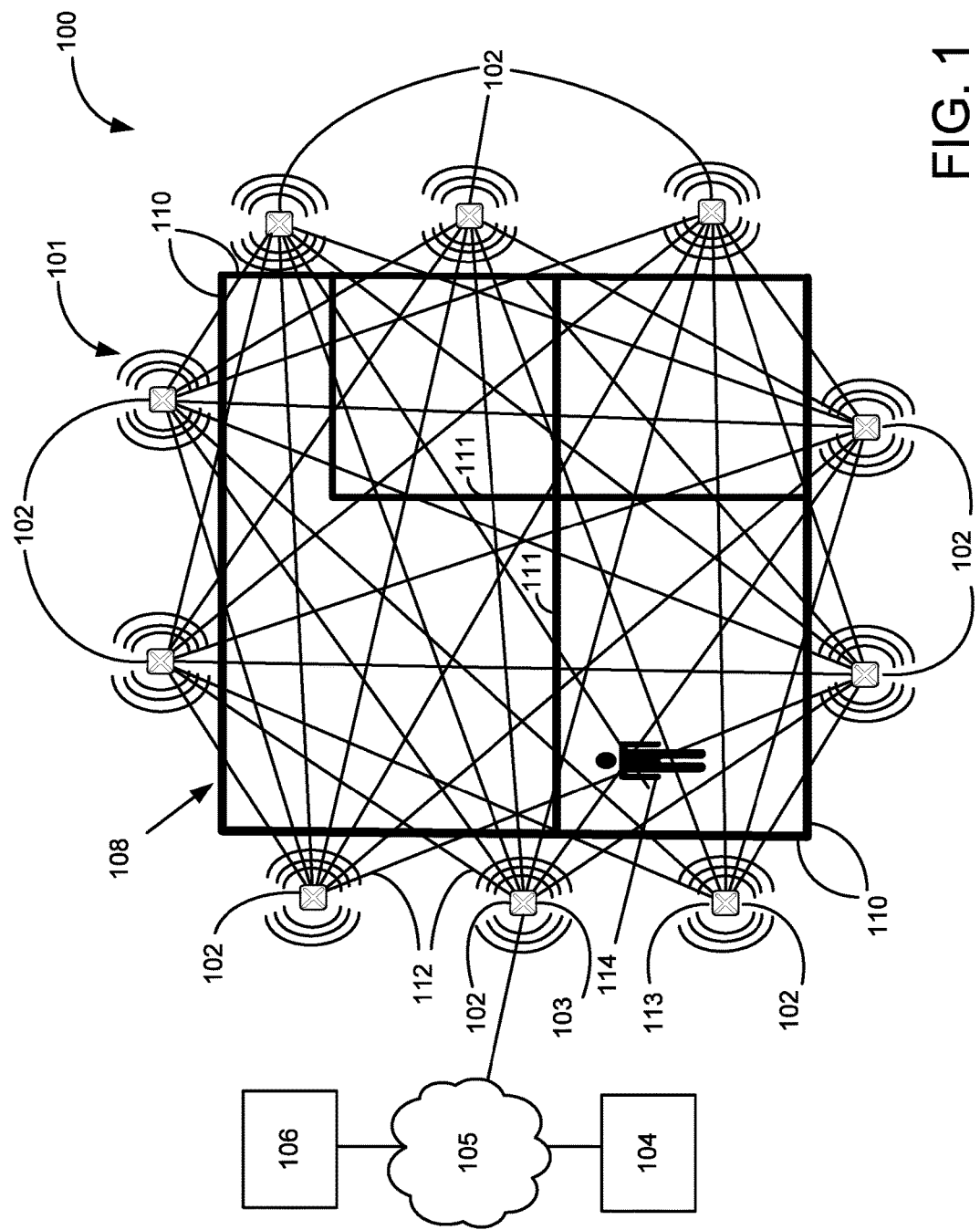
FIG. 1 is a depiction of a system of device-free motion detection and presence detection, according to one embodiment.

Many forms of motion and presence detection exist today, including optical and thermal/infrared cameras, passive/active infrared motion detectors, acoustic sensors, vibration sensors, cameras, induction coils, and radio frequency (RF) sensors. These technologies can be useful in applications such as security, automated doors and appliances, robotics, senior/handicap assistance, shopper tracking, traffic analysis, and others.

Motion detection and/or presence detection has many applications. For example, motion detection and/or presence detection may be of interest for identifying when a person (e.g., an intruder) has entered an area of interest. Motion detection and/or presence detection may also be of interest for identifying when a person (e.g., Grandmother) is present in an area of interest but is not moving as normal (e.g., she has fallen and is injured or otherwise unable to move). Motion detection and/or presence detection may also be of interest for gathering statistics on traffic (e.g., foot traffic, automobile traffic) within or through a given area of interest (e.g., a retail store, a highway, or a border of a country).

One of several challenges of existing motion detection and/or presence detection technologies is their susceptibility to false hits. Wind, abrupt changes in heat and light, small animals/pets, insects, dust, debris, obstructions, and other otherwise uncontrolled and/or unexpected conditions limit the effectiveness and accuracy of these technologies in detecting motion or presence in an area of interest. For example, passive infrared (PIR) motion sensors operate based on thermal energy, and abrupt changes in temperature (e.g., sunrise through a window, heating, ventilation, and air conditioning (HVAC) vents) can cause the sensor to trip. Obstructions (e.g., moved furniture, high shelving) can also severely impact performance of these existing technologies. Moreover, these existing technologies may pose a risk to privacy, particularly when imaging is involved.

Recent research and advancements have developed motion and presence sensing techniques that utilize received signal strength (RSS) measurements from wireless devices. For example, researchers have demonstrated motion detection using RSS measurements in IEEE 802.15.4/802.11 networks. Also, radio tomographic imaging (RTI) techniques have been developed to image large scale areas and are analogous to computed tomography technologies used to image inside the human body for medical purposes. RTI results can be processed to detect motion, count people, detect presence of people or objects, and locate individuals. Researchers have demonstrated that it is possible to estimate the number of people standing along a single data link by examining changes to signal strength. Researchers have also shown a statistical inversion method for locating and detecting humans within a wireless network using only signal strength.

The present disclosure is directed to systems and methods of device-free motion and presence detection. The disclosed systems and methods may include a mesh network RF sensing technology that can detect and quantify the presence or motion of people and other objects within an area of interest.

When an object is located near a wireless communication link, the object may disturb the radio waves as they pass through, causing changes in the measured signal strength at a receiver. These changes and disturbances can be used to infer motion, presence, location, quantity, and other characteristics of the objects.

The systems and methods of the present disclosure may include a peer-to-peer mesh detection network having a plurality of sensing nodes. The location of each node in a detection network does not need to be known. Instead of using individual link RSS values to detect the presence of people, information from a plurality of links in the detection network may be combined into a single aggregate statistic before any thresholding. The aggregate detection network statistic may be continuous, allowing for detection of presence and estimation of other important metrics such as quantity and speed. The aggregate detection network statistic can be dependent on particular patterns of movement allowing for more intelligent triggering of alarms. The number of nodes in a detection network, according to the present disclosure may not need to be limited, pre-defined, or assumed constant. Similarly, the number of links between nodes in a detection network may not need to be limited, pre-defined, or assumed constant. Furthermore, a network can self-form and self-heal when nodes are added or removed. The computations to determine detection network statistics can be arranged in various client-servers and distributed processing architectures.

While many of the examples provided herein are disclosed in terms of a person, motion detection and/or presence detection, as these terms are used in the present disclosure, refer to any movement or presence (or lack of movement or presence) of an object in an area of interest that is different than movement or presence in the area of interest when in a "base state." The base state of an area of interest may be arbitrarily defined, for example, during calibration, such that an area of interest in a base state may include movements and the presence of objects. A change from the base state may be a movement, a new presence, or a new lack of a presence (an object in the area of interest in the base state that is removed from the area of interest). Movement and presence of objects that are a part of the base state of the area of interest may be filtered out, similar to "zeroing out" a scale by defining a base level of motion and/or presence within the area of interest that accounts for such movements and presence. Moreover, predictable or otherwise expected movements and/or presence within an area of interest can also be accounted for and filtered out. For example, movement of indoor plants in response to activation of an HVAC system, presence of a small pet, or trees blowing in the wind may be included in the base state.

Embodiments may be best understood by reference to the drawings, wherein like parts are designated by like numerals throughout. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In some cases, well-known structures, materials, or operations are not shown or described in detail.

FIG. 1 is a depiction of a system 100 of device-free motion detection and presence detection, according to one embodiment. The system 100 may include a plurality of wireless radios (nodes) 102 and one or more computing devices 104, 106. The nodes 102 can be positioned around an area of interest 108 and configured in a mesh wireless detection network 101. The nodes 102 may be in communication with the one or more computing devices 104, 106. In one embodiment, a client computing device 104 may receive data from the nodes 102 and process the data. The results of processing the data may be communicated by the client computing device 104 to a server computing device 106. In still another embodiment, the client computing device 104 may receive data from the nodes 102 and communicate the data over a network 105, such as the Internet, to the server computing device 106. As can be appreciated, a variety of configurations of the client computing device 104 and server computing device 106 may be possible.

The area of interest 108 can have virtually any shape, and the size of the area may be limited only by the transmission range of the wireless radio nodes 102. A particular shape of the area of interest 108 is not required, nor is a particular placement of the nodes 102. Placement of the nodes 102, including but not limited to spacing between the nodes, may be regular, irregular, random, or in a desired shape. The nodes 102 can be placed behind walls 110 or other obstructions, inside containers, or directly in a line of sight with other nodes 102. The area of interest 108 may include obstructions, such as interior walls 111, furniture, shelving, and the like.

The nodes 102 in the wireless detection network 101 may have the ability to transmit, receive, or both transmit and receive. Links 112 (portrayed as lines linking one node to another) between the nodes 102 in FIG. 1 represent the transmission of a wireless signal from one node 102 to another. The wireless signal may be a radio wave. Radio waves are capable of penetrating solid materials, so links 112 are still functional when they pass through the exterior walls 110, the interior walls 111, and other obstructions. The nodes 102 can be any radio module or any wireless hardware capable of measuring signal strength. The signal strength measurements may be measured and/or reported by a received signal strength indicator (RSSI) or link quality indicator (LQI) of the radio module or wireless hardware. RSSI is a report on received radio frequency power, while LQI is a unit-less value dependent on the wireless communication bit error rate. Examples of radio modules or wireless hardware that provide RSSI include, but are not limited to, mobile phones, IEEE 802.11 wireless Internet routers and cards (WiFi), and IEEE 802.15.4 modules (Zigbee). Examples of radio modules or wireless hardware that provide LQI include, but are not limited to, Amtel radio chips, CC radio chips from Texas Instruments, and the like.

One or more of the nodes 102 may be designated as a base station control 103. The base station control 103 may be a node 102 that has special responsibilities to report signal strength measurements to a processing unit, such as the client computing device 104. A base station control 103 may not participate in measuring signal strength, but may collect these measurements for processing and protocol control.

One of the nodes 102 may be designated a schedule manager 113 to manage "join beacons" and "join requests," for automatically adding additional nodes 102 to the wireless detection network 101. Automatic addition and removal of nodes 102 from the wireless detection network 101 is discussed in more detail below with reference to FIG. 6. Any node or nodes could be schedule manager(s), and can be assigned or unassigned the role of schedule manager at any time.

When a person 114 or other object enters the area of interest 108 within the wireless detection network 101, their body disrupts the radio waves as they pass through and near the links 112 of the wireless detection network 101. This disturbance results in changed signal strength values that can be measured at each receiver node 102. These measurements can be processed to infer the presence, motion, location, velocity, or speed of objects within the wireless detection network 101, and thus within the area of interest 108.

The one or more computing devices 104, 106 may receive signal strength measurements, for example, from the base station control 103, and process the measurements. The computing devices 104, 106 may provide electronic notifications, such as email, text message, a tweet, and/or a telephone call, to one or more designated recipients, notifying the user(s) that a person or object has moved or entered the area of interest. The computing devices 104, 106 may include and/or be networked with a server or module configured to register the designated recipient(s) and contact information and process communications to the designated recipient(s). The computing devices 104, 106 may also be used to trigger devices such as lights, speakers, sirens, motors, locks, doorways, or any other mechanism that is appropriate for the application.

Link and Aggregate Disturbances

As motion, presence, or changes to physical objects occur within the wireless detection network 101, the signal strength of nearby links 112 may change due to reflection, scattering, absorption, and diffraction of the wireless signals around the object. The object need not be located directly on the line-of-sight path from a transmitter node 102 to a receiver node 102, since multipath reflections from the object can cause a significant change in signal strength.

Figure 2:
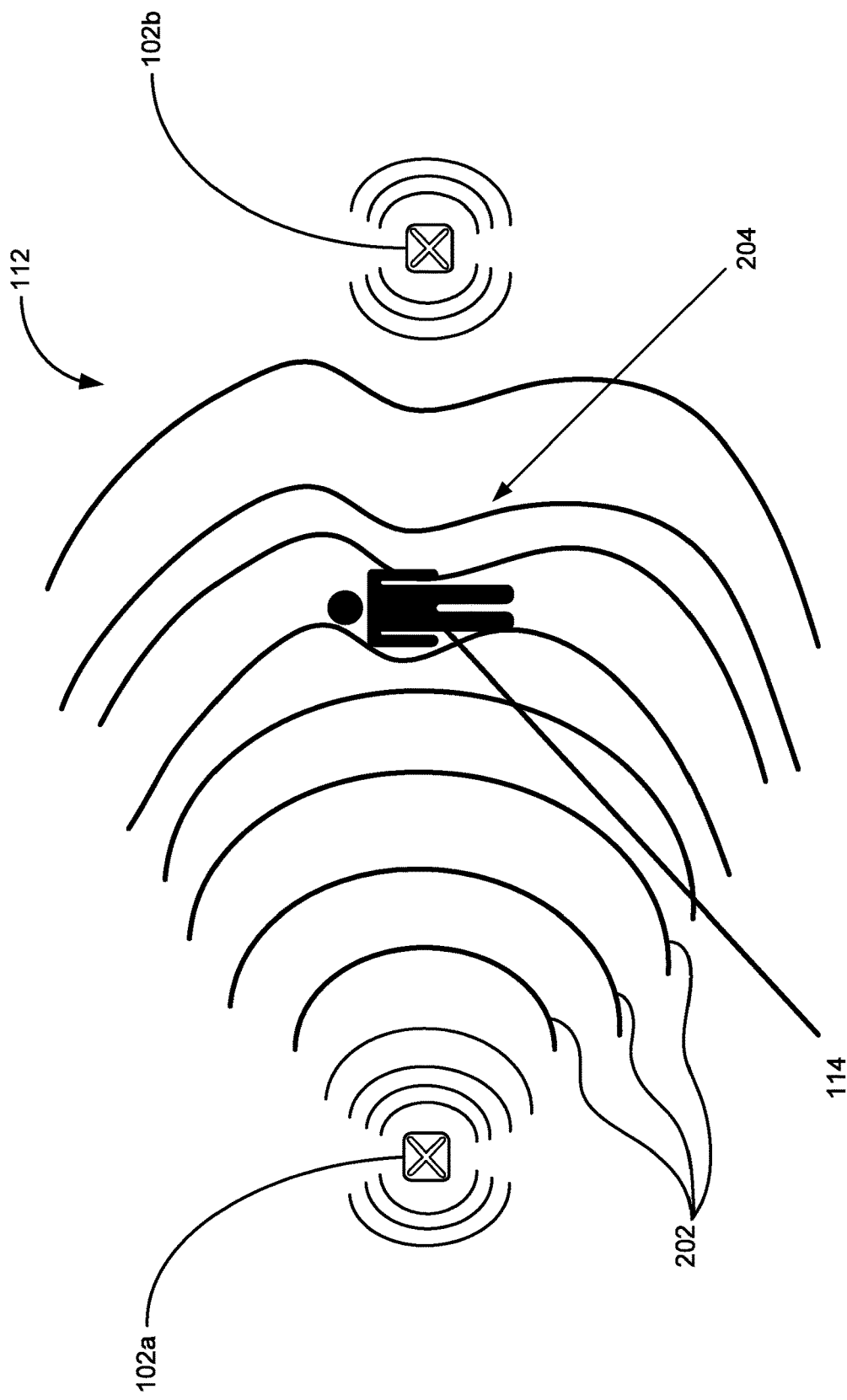
FIG. 2 is a depiction of a link disturbance.

FIG. 2 is a depiction of a link 112 being disturbed by a person 114 walking through the link 112. In FIG. 2, the link 112 is portrayed as a grouping of wireless signals 202 (shown as curved lines) rippling out from a first node 102a (e.g., a transmitter node) and extending toward a second node 102b (e.g., a receiver node). The link 112, as described, may be formed by transmission and receipt of wireless signals 202. As can be appreciated, the first node 102a may transmit wireless signals 202 and a second node 102b may receive the wireless signals 202. (Simultaneously the second node 102b may be transmitting other wireless signals (not shown) and the first node 102a may be receiving the other wireless signals.) The person 114 walking through or near the link 112 may disrupt or disturb the wireless signals 202, thereby creating a disturbance 204 that decreases the RSS at the second node 102b. The disturbance 204 in the wireless signals 202 may be due to reflection, scattering, absorption, and diffraction of the wireless signals 202 around the person 114.

The link disturbance 204 can be quantified. For example, the link disturbance on a link 1 at time t, which may be represented mathematically as qi(t), may be measured or otherwise quantified using a calculation of RSS that is dependent on the motion, presence, and/or location of the person 114 or other object. For example, if a windowed variance is used as a link disturbance calculation, then $$q_i(t) = \text{var}[r_i(t-T, t)] = E[(r_i(t-T, t))^2] - E[r_i(t-T, t))] \quad (1)$$

where ri(t−T,t) are RSS measurements from time t−T to t (e.g., T seconds, or other time unit). Using variance as the link disturbance calculation may be appealing because it is easy to calculate and does not rely on calibration data. As can be appreciated, other link disturbance calculations may be used. For example, other link disturbance calculations that may be used include, but are not limited to: changes in mean signal strength from calibration measurements; summations of normed differences from mean or calibration measurements; autocorrelations and co variances; and power spectral densities.

The individual nodes 102 of a wireless detection network 101 (See FIG. 1) may each measure and transmit an RSS of a link 112 with a particular other node 102 and transmit or otherwise communicate that data to the client computing device 104. The client computing device 104 may perform the link disturbance calculation. The results of the link disturbance calculation may be transmitted to the server computing device 106. In another embodiment, the data may be communicated by the client computing device 104 to the server computing device 106. The server computing device 106 may perform the link disturbance calculation.

Figure 3A:
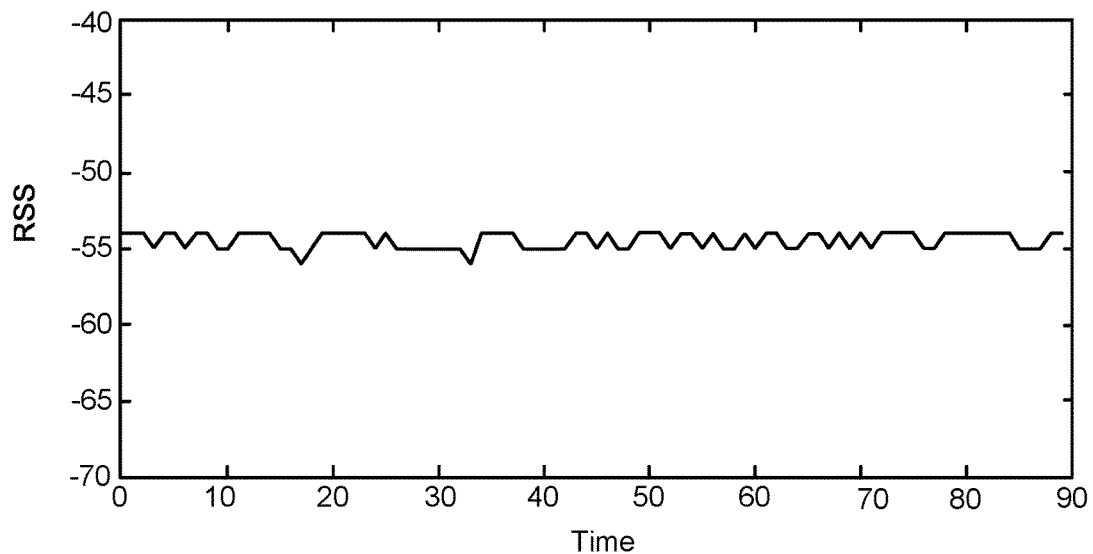
FIGS. 3A and 3B are time plots of a signal strength of a link as it is disturbed over time when an object such as a person moves through and/or near the link.
Figure 3B:
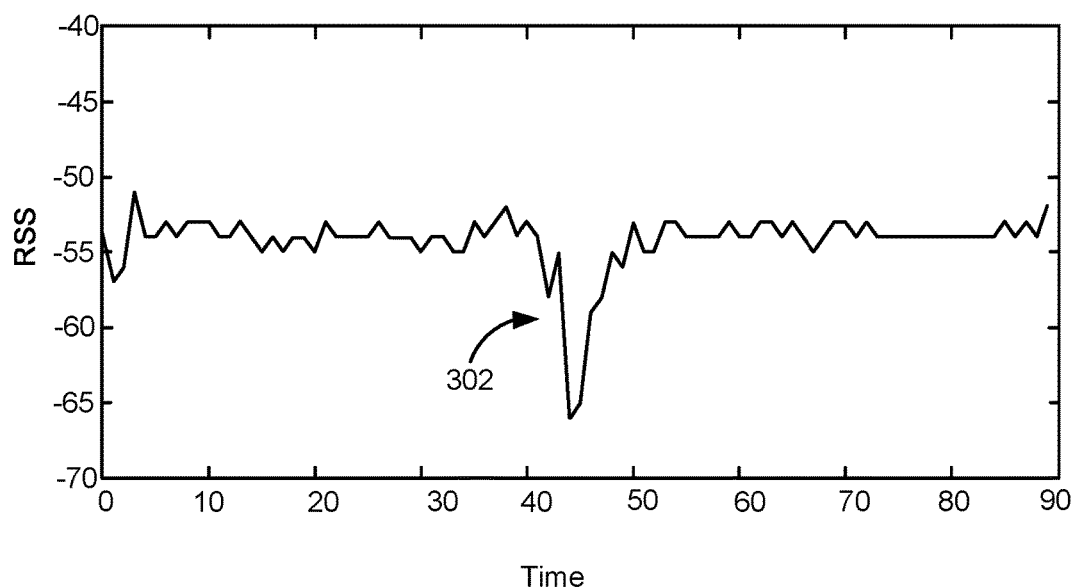

FIGS. 3A and 3B are time plots of measured RSS values of an actual experiment. FIG. 3A shows the time plot when the link (and/or the area of interest) is empty, or no person or object is moving in or near the link (and/or the area of interest). FIG. 3B shows the time plot when the link is disturbed by a person or object moving into or near the link (and/or the area of interest). When a person walks near a wireless link, their body causes a significant disturbance 302 to the measured RSS. For a visual reference, the plot in FIG. 3B also includes the measured RSS of the same link at points in time (e.g., t=20 or t=80) when no motion exists within the network.

A system of the present disclosure system can sense motion and presence of a person or object using disturbances in both link signal strength and aggregate signal strength. As described, wireless nodes may be placed throughout an area of interest which forms a mesh network. Each node may be both a transmitter and receiver, so a total of N(N−1) links may exist within the network when there is full connectivity, where N is the total number of nodes.

The aggregate signal strength disturbance is Q(t) defined as the summation of link signal strength disturbances for the entire network $$Q(t) = \sum_{i=1}^{M} q_i(t) \quad (2)$$

where M is the total number of links in the network.

Figure 4:
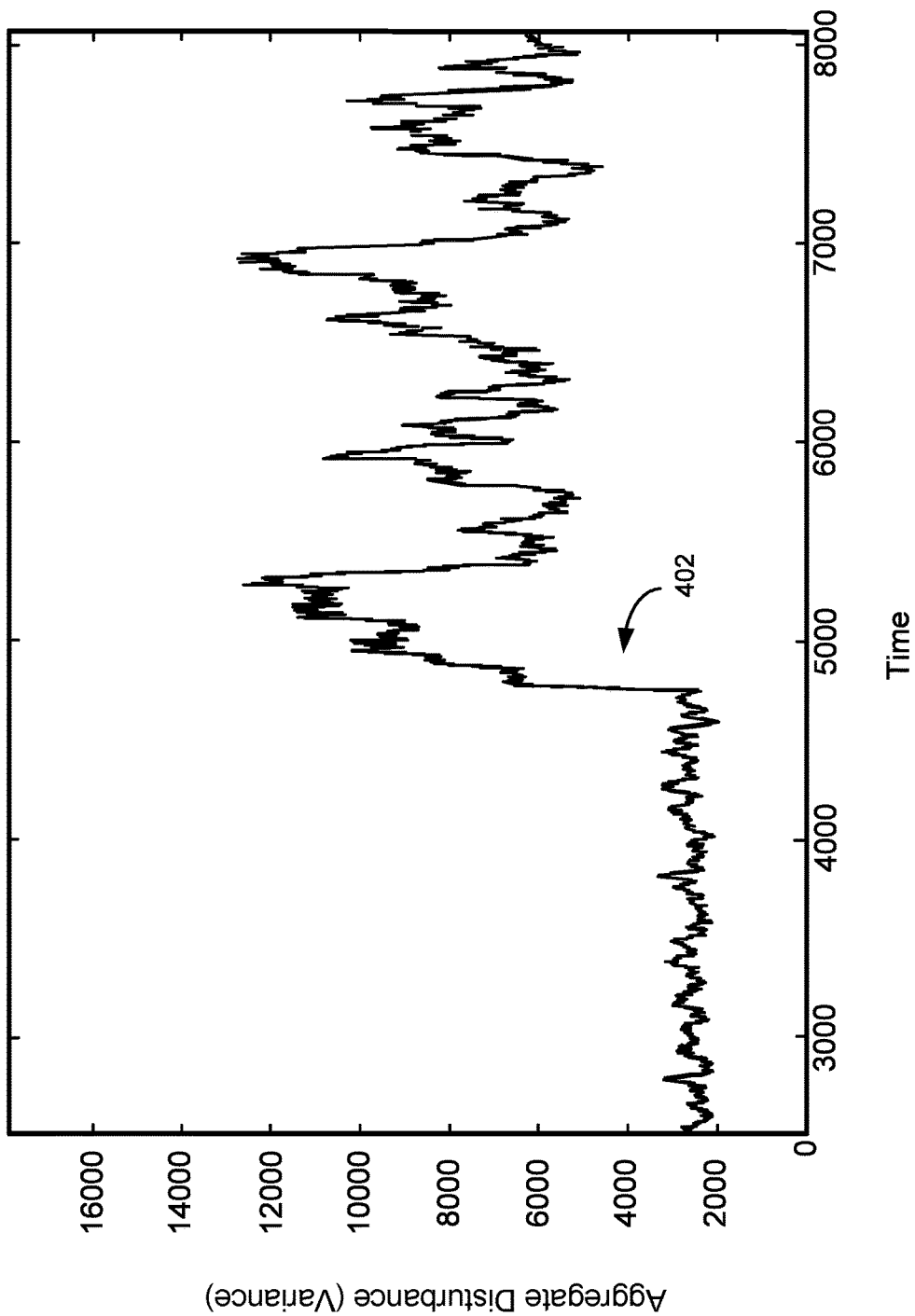
FIG. 4 is a time plot of an aggregate disturbance (variance) of a network over time when an object such as a person moves within or into the network.

FIG. 4 is a time plot of an aggregate disturbance (variance) of a network over time when an object such as a person moves within or into the network. The plot depicts a substantial increase 402 in the aggregate disturbance. In this case, the person enters the network area at approximately t=4750 and a variance metric with a period of one second is used.

In many cases, a system and method of the present disclosure may involve a calibration of individual or aggregate link disturbances, in order to detect a change in the environment. Calibration can be performed by measuring disturbances for each link in the network during a known period. During this time, the network may be empty of any movement, and the disturbances caused by harmless forms of motion may be included as part of the calibration. For example, trees blowing in wind can significantly change RSS measurements. If the disturbances caused by the tree are captured during calibration, these disturbances may be filtered out and excluded from detection statistics.

Calibration can also be performed while the system is in use, and adjusted for better performance over time. Instead of using data from a known calibration period, measurements from recent history can be processed and used for comparison to current measurements. The simplest example of this is using changes to the mean of each link. A long history of data can be used to determine the calibration mean for each link, while the mean of shorter histories can be used to see if something has changed recently.

As can be appreciated, aggregate disturbances can be calculated using other methods other than summing link disturbances. For example, linear weighting can be applied to each link disturbance, resulting in a weighted summation that may better indicate presence or motion. In this case, $$Q_W(t) = \sum_{i=1}^{M} w_i q_i(t) \quad (3)$$

where $w_i$ is a weighting element. The weight elements for each link can be calculated using calibration or history data, known information about the state (location, velocity, etc.) of the network nodes, or known information about moving objects within the network. In addition to linear weight summations, other non-linear combinations of link disturbances can be utilized to determine a non-linear aggregate disturbance.

Detection and Estimation

The time varying aggregate disturbance Q(t) can be used to detect presence and/or motion, or to estimate other valuable characteristics, such as quantity, velocity, or size. Using the aggregate disturbance may be useful for a number of reasons, including but not limited to the following:

- Data is not lost during quantization and thresholding of each link.
- The node locations do not need to be known.
- Aggregate disturbances are continuous, making it possible to estimate quantities and characteristics, not just detect.
- Aggregate disturbances can be calculated taking into account patterns of movement.
- Aggregate disturbances can be calculated recursively to save processing power and memory.
- Various metrics can be used as the basis for each link in the aggregate disturbance, depending on the situation and desired functionality.
- Aggregate disturbances can be scaled easily according to the number of measurement links in the network.

As shown in FIG. 4, when a person enters a network area, the aggregate disturbance increases 402 dramatically. By setting an appropriate threshold, the entering of the person to the area can be detected. The size and speed of the person entering may affect the change in aggregate disturbance. Similarly, the number of people who have entered may affect the change in aggregate disturbance. This allows an algorithm to estimate these quantities (size and/or number of people) by using multiple thresholds, or by using statistical analyses of the disturbances.

Disturbance Patterns and Signatures

The aggregate and link disturbances can also take into account patterns of motion and presence to intelligently trigger alarms and provide other notifications. For example, the system can be trained such that motion along a particular path does not trigger an alarm, while motion along a restricted path does.

Since the many nodes of the network surround an area, each pattern of movement will create a different "signature" of the resulting link and aggregate disturbances. Walking down a hallway may cause disturbances on a particular subset of links, but walking into the rooms off the hallway may cause a different subset of links to be affected. These signatures can be trained into the system by walking in particular patterns/areas during installation or training periods.

Token Passing Protocol

Detecting and estimating device-free characteristics using RSS measurements presents some unique wireless protocol challenges. Maintaining the transmission of each node in the network at a high level may be desirable in order to capture fast movements. However, as the number of nodes in the network increases, having each node reduce its rate of transmission may be desirable to avoid collisions. The systems and methods of the present disclosure may include a protocol that is designed to keep sampling/transmission rates high, while also preventing collisions and allowing for automatic addition and removal of nodes to the network.

To avoid network transmission collisions, a token passing protocol may be used. Each node can be assigned an ID number and provided with a schedule time slot. When a node transmits, each node that receives the transmission can examine the sender identification number. The receiving nodes can check to see if it is their turn to transmit according to the assigned time slot, and if not, they wait for the next node to transmit. If the next node does not transmit, or the packet is corrupted, a timeout may cause each receiver to move to the next node in the schedule so that the cycle is not halted.

Figure 5:
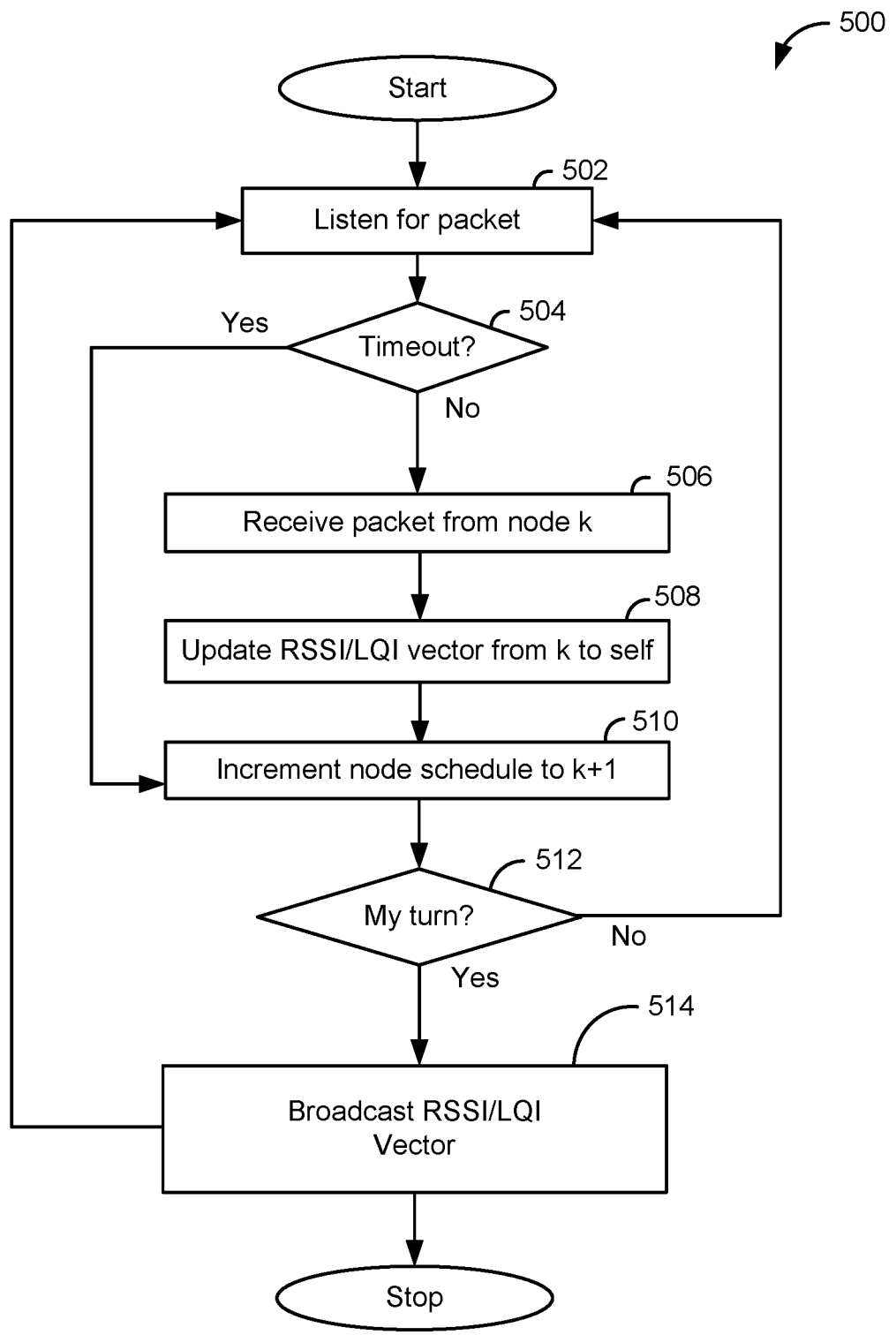
FIG. 5 is a flow diagram of a token passing protocol to prevent network collisions.

FIG. 5 is a flow diagram that illustrates one embodiment of a token passing protocol 500. The protocol 500 may be performed by each node of a wireless network, according to the present disclosure. Each node may listen 502 for a packet (i.e., a transmission) from a transmitting node k, where node k may be identified as the current transmitting node. If no packet is received, a timeout 504 may occur. A transmitted packet is received 506 from node k. Each node may update 508 an RSSI/LQI vector for the link from node k to the node itself. The node schedule may be incremented 510 to k+1, thereby advancing the node that is transmitting to node k+1. Each node then determines 512 whether it is node k+1, such that it is now its turn to transmit. If the node is not node k+1 (e.g., it is not the node's turn to transmit), then the node again listens 502 for a packet from a transmitting node. If the node is node k+1 (it is the node's turn to transmit), then the node broadcasts 514 the RSSI/LQI vector. The RSSI/LQI vector has been filled with measurements as each of the other nodes has transmitted to the currently transmitting node. This cycle may be repeated indefinitely, filling the RSSI/LQI vector upon receipt of packets from the other nodes in the network, and then broadcasting the values in the RSSI/LQI vector to the other nodes when the protocol allows.

Self-Forming Network

Allowing new nodes to join a wireless detection network without requiring the firmware on the nodes to be reset, reconfigured, or reprogrammed may be desirable. With a protocol that allows new nodes to join dynamically, systems can be deployed and improved very quickly based upon need. More nodes may be added at a later time to either increase the monitoring area, to improve sensitivity/accuracy, or to reduce false alarms.

Figure 6:
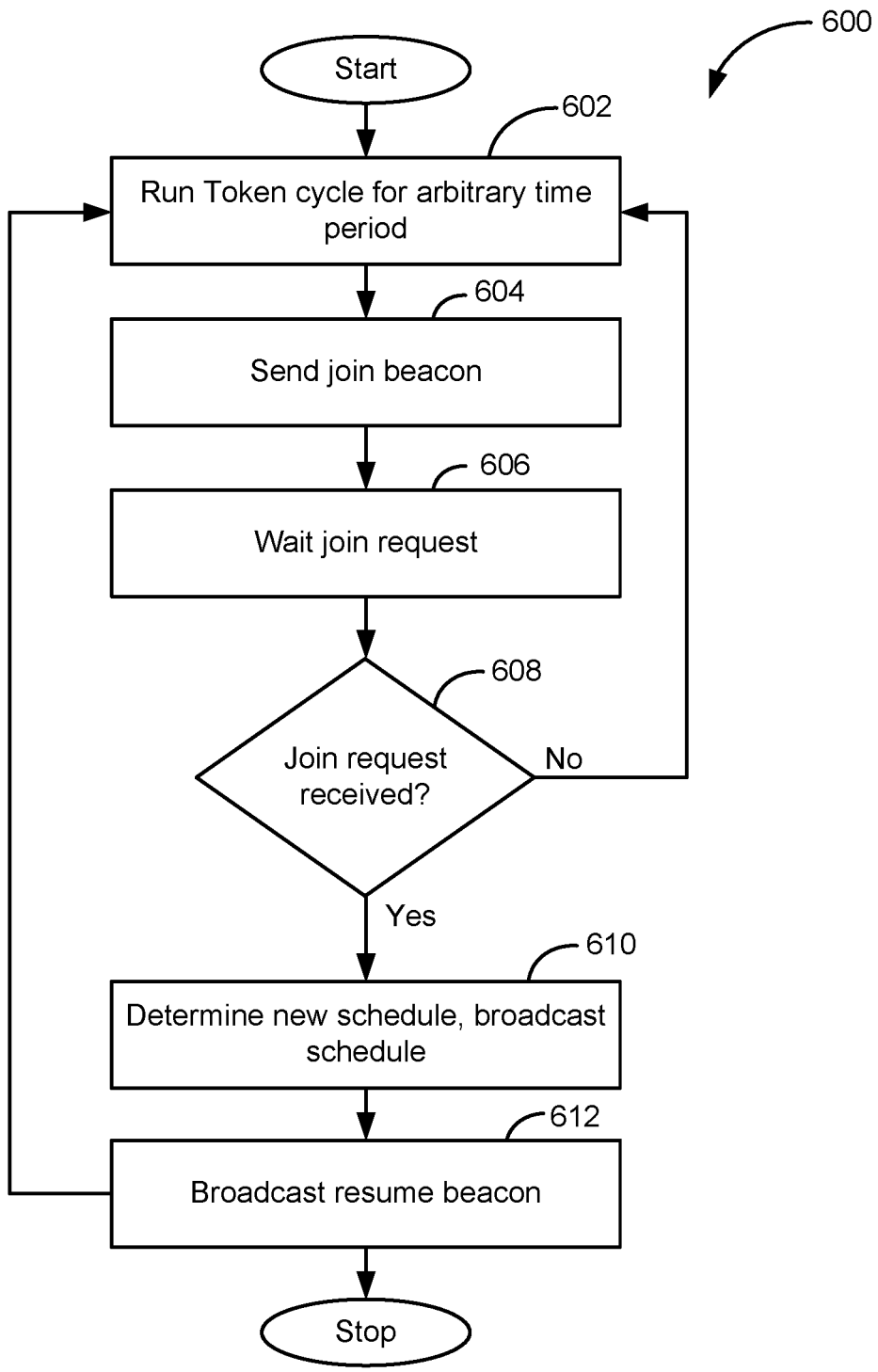
FIG. 6 is a flow diagram of a protocol for allowing new nodes to dynamically join a sensing network.

FIG. 6 is a flow diagram of one example of a protocol 600 for allowing new nodes to be dynamically added to a wireless sensing network. The system may run 602 a token passing protocol, such as the protocol 500 of FIG. 5, for an arbitrary time period. To signal to new nodes to join the token passing ring, a "join beacon" may be periodically transmitted 604 either from one of the sensing nodes, or from a base station control. The join beacon may signal to the currently participating nodes to stop transmissions, thus, allowing any possible new nodes to join. The join beacon may also signal to the new nodes that they are clear to transmit a "join request" back to the other nodes in the network. The system may then wait 606 for a join request for a configurable and/or adjustable time period.

A node that manages join beacons and requests may be referred to as the "schedule manager." Any node or nodes could be schedule manager(s), and can be assigned or unassigned the role of schedule manager at any time. The role of schedule manager can be assigned in a variety of ways. Schedule managers can be chosen during deployment by a user, assigned dynamically from calculations by a processing unit via base station control commands, by neighboring nodes, or can be assigned by themselves. A simple configuration, according to one embodiment, may assign the base station control the role of schedule manager permanently.

A determination 608 is made whether a join request is received. If a join request is not received, the protocol may return to running 602 the token passing protocol. Once a join request has been received, the schedule manager(s) may process the request to determine 610 where the new node(s) may fit in the token passing schedule. For example, if 10 nodes are currently participating in the network, and an additional node sends a join request to the network, the new node may be appended to the schedule in the eleventh slot, or another node may move to the eleventh slot and the new node will take its place. In another embodiment, a plurality of nodes may shift slots to allow the new node to fill a slot.

After an appropriate schedule slot for the new node is determined 610, the new node's slot may be transmitted to each node in the network, including the new participant. The schedule manager can then broadcast 612 a "resume" beacon to the network to continue running 602 the token passing protocol and resume collection of RSS measurements.

As will be appreciated, a variety of other protocols are possible to allow new nodes to be dynamically added to a wireless detection network.

Self-Healing Network

Allowing the sensing network to automatically remove nodes from the token passing protocol when they are damaged, without power, physically removed, or disabled by a user may also be desirable. By automatically removing "dead" nodes from the sensing network, the token passing cycle can retain its high rate of transmission and old measurements that correspond to removed or dead nodes can be discarded.

Signal strength and link quality may be factors in determining if a transmitted data packet will reach its destination. Some links may have very strong connections where very few transmitted packets may be lost during transmissions. Other links may be very weak, where only occasionally a transmitted packet may reach its destination. Other links may fall anywhere in between these two extremes.

Figure 7:
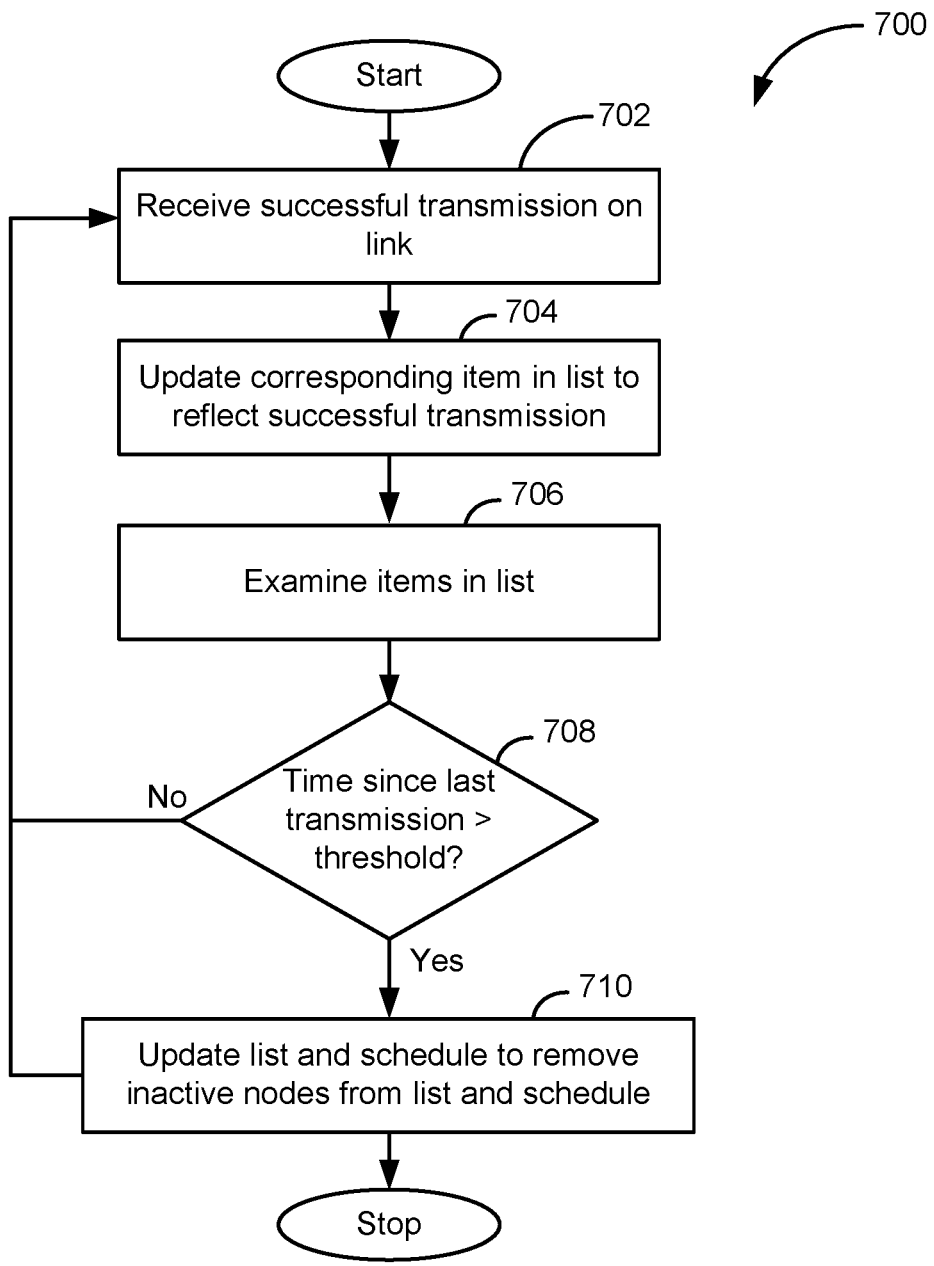
FIG. 7 is a flow diagram of a protocol for healing a sensing network when a node is removed.

FIG. 7 is a flow diagram 700 of a protocol for healing a sensing network when a node is removed, according to one embodiment. To determine if a node or link is active, meaning that transmissions are being sent and received on a regular basis, a list can be maintained by the schedule manager(s). According to one embodiment, when a successful transmission is received 702 on a particular link, the item in the list corresponding to the particular link is updated 704 with a timestamp or counter value. If after an arbitrary period of time, or after an arbitrary number of cycles, a node or link has not successfully transmitted to the other nodes in the network, the list will not be updated. During each cycle, the list may be examined 706 to determine which nodes and links are active. For example, a determination 708 may be made whether the time since a last successful transmission on a link exceeds a threshold. If examination of the list shows that a particular node or link is not receiving, the list may be updated 710 to remove this node or link from protocol schedules and measurement processing. To avoid the problem of repeated forming/healing of nodes and links that have very low probabilities of successful transmission, the list can be updated, for example, after an arbitrary number of successful transmissions in a designated time period.

Processing Architectures and Interfaces

The processing of disturbances in the network can be achieved using a variety of architectures. FIGS. 8A-8D illustrate various embodiments of systems of device-free motion detection and presence detection having different architectures. The systems, may include, but are not limited to, a plurality of sensing network nodes 802, a computing device 804, a server computing device 806, a user interface 830, and one or more notification devices 832, 834. The plurality of sensing network nodes 802 may be wireless transceivers that capture signal strength measurements. The computing device 804 may be a client computing device that may process incoming signal strength measurements. The computing device 804 may couple to the server computing device 806 over a network 805. The server computing device 806 may remain powered on, typically connected to the internet, and capable of receiving incoming connections. The user interface 830 may, for example, be presented by/on the computing device 804 and may allow a user to start/stop detection by the nodes 802 (or network 801) and set parameters of the given system. The notification devices 832, 834 may display alerts, alarms, or other information to a user. Examples of notification devices 832, 834 may include, but are not limited to speakers, lights, phones, pagers, and computers, etc. Examples of architectures are described in the following sections.

On-Site Processing, on-Site User Interface

Figure 8A:
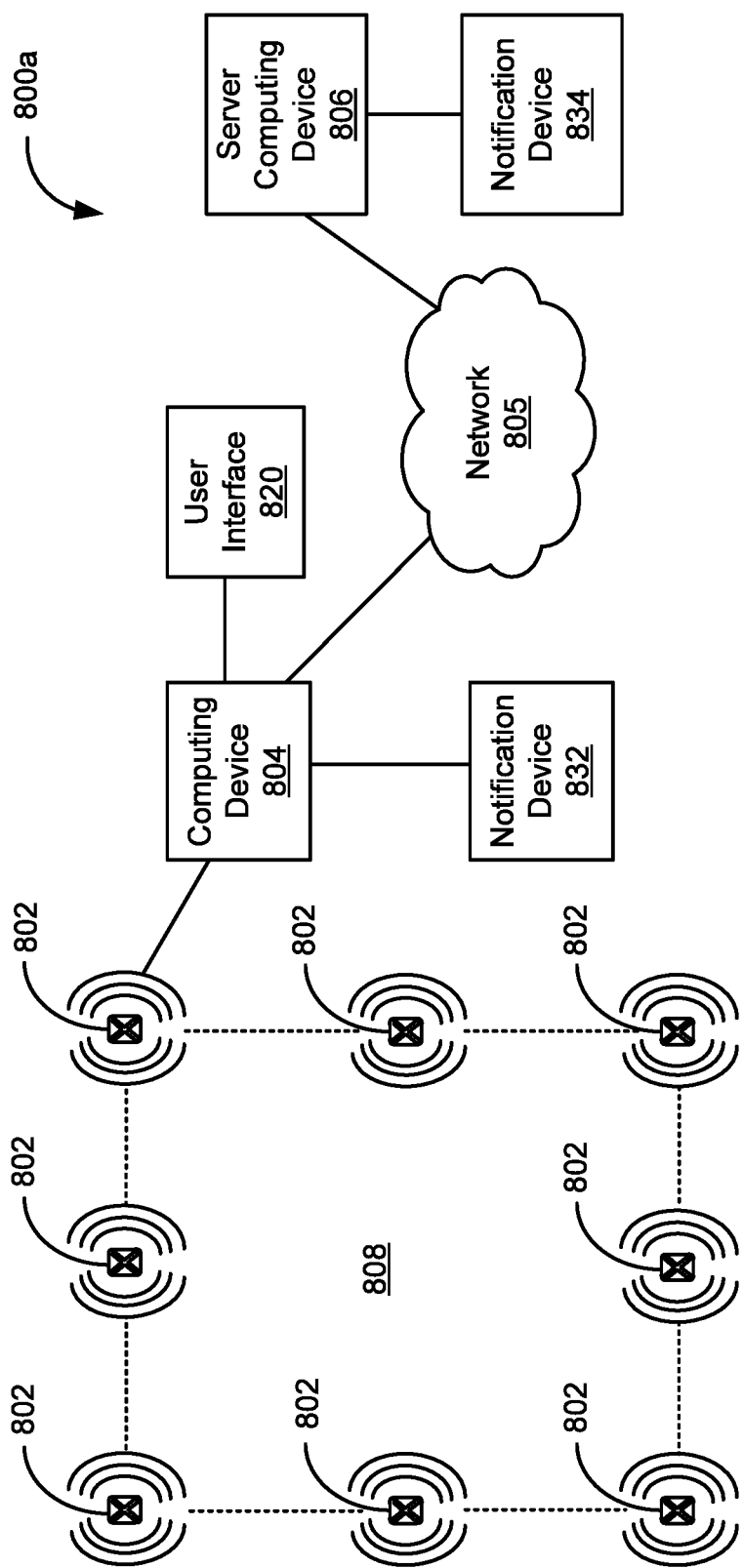
FIGS. 8A-8D illustrate various embodiments of systems of device-free motion detection and presence detection having different architectures.

FIG. 8A illustrates a system 800a of device-free motion detection having an architecture in which a client computing device 804 and a user interface 830 may be located in the same location as the area of interest 808 being monitored. A wireless detection network 801, comprising a plurality of nodes 802, may report signal strength measurements back to the client computing device 804. The client computing device 804 may be connected to the user interface 830, where it can be started, stopped, and adjusted. When a disturbance (e.g., motion and/or presence) occurs in the wireless detection network 801, the processing unit 802 can connect to an on-site notification device 832 (e.g., an alarm, siren, lights, door locks, etc.). The processing unit 804 may also connect to a remote server computing device 806 via a communications network 805, and forward the alert to a remote notification device 834 (e.g., a mobile phone, pager, monitoring service).

On-Site Processing, Remote User Interface

Figure 8B:
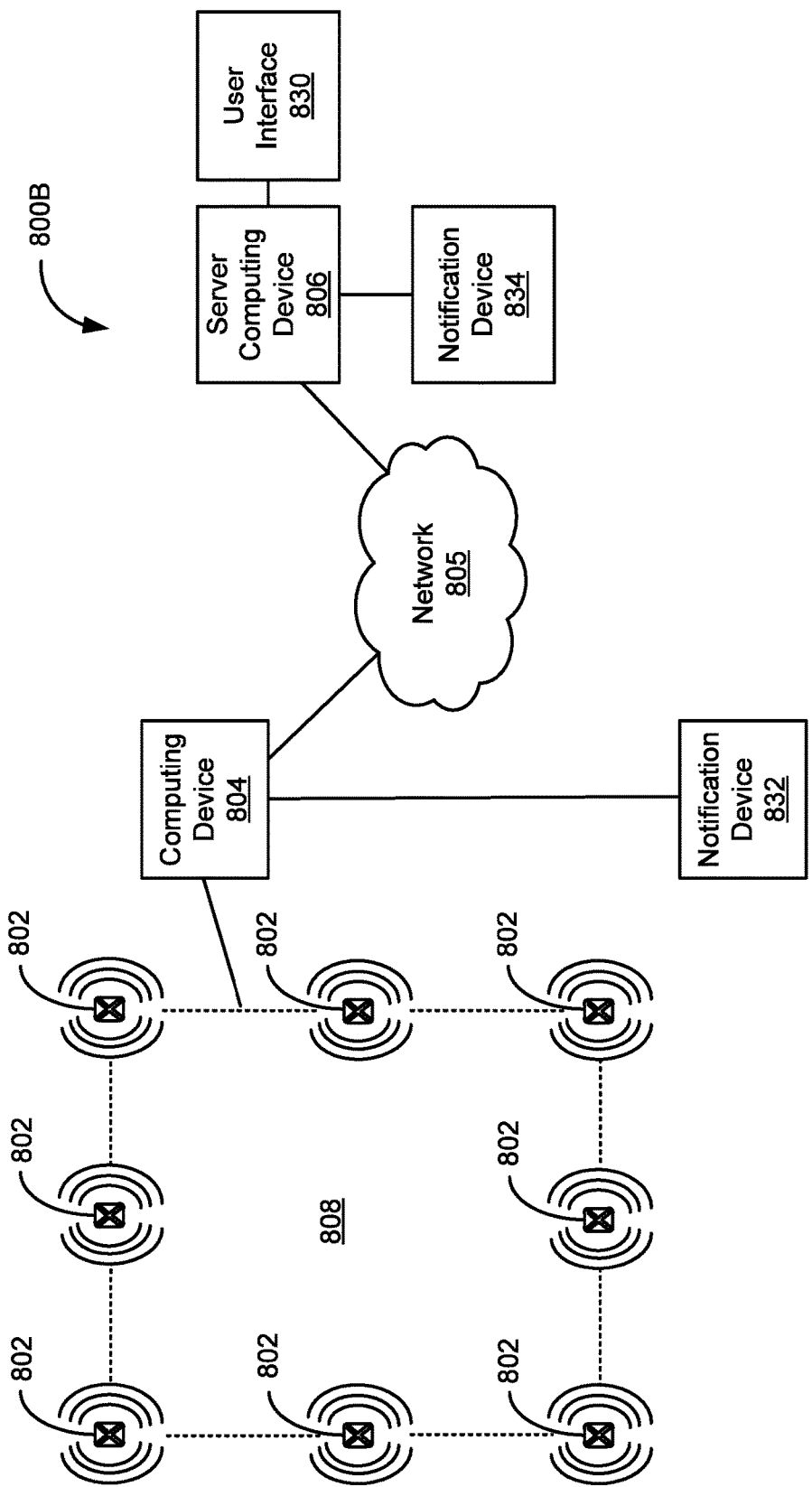

FIG. 8B illustrates another embodiment of a system 800b in which a client computing device 804 may be located on-site and the user interface 830 may be considered remote. The network 801 may report measurements back to the client computing device 804, which may be connected to a remote server computing device 806. The user interface 830 can connect to the server computing device 806 remotely to control the client computing device 804, set preferences, and start/stop notifications. When the client computing device 804 has information to report, it may pass the information to the remote user interface 830 or to a remote notification device 834, usually through the server computing device 806.

Cloud Processing

Figure 8C:
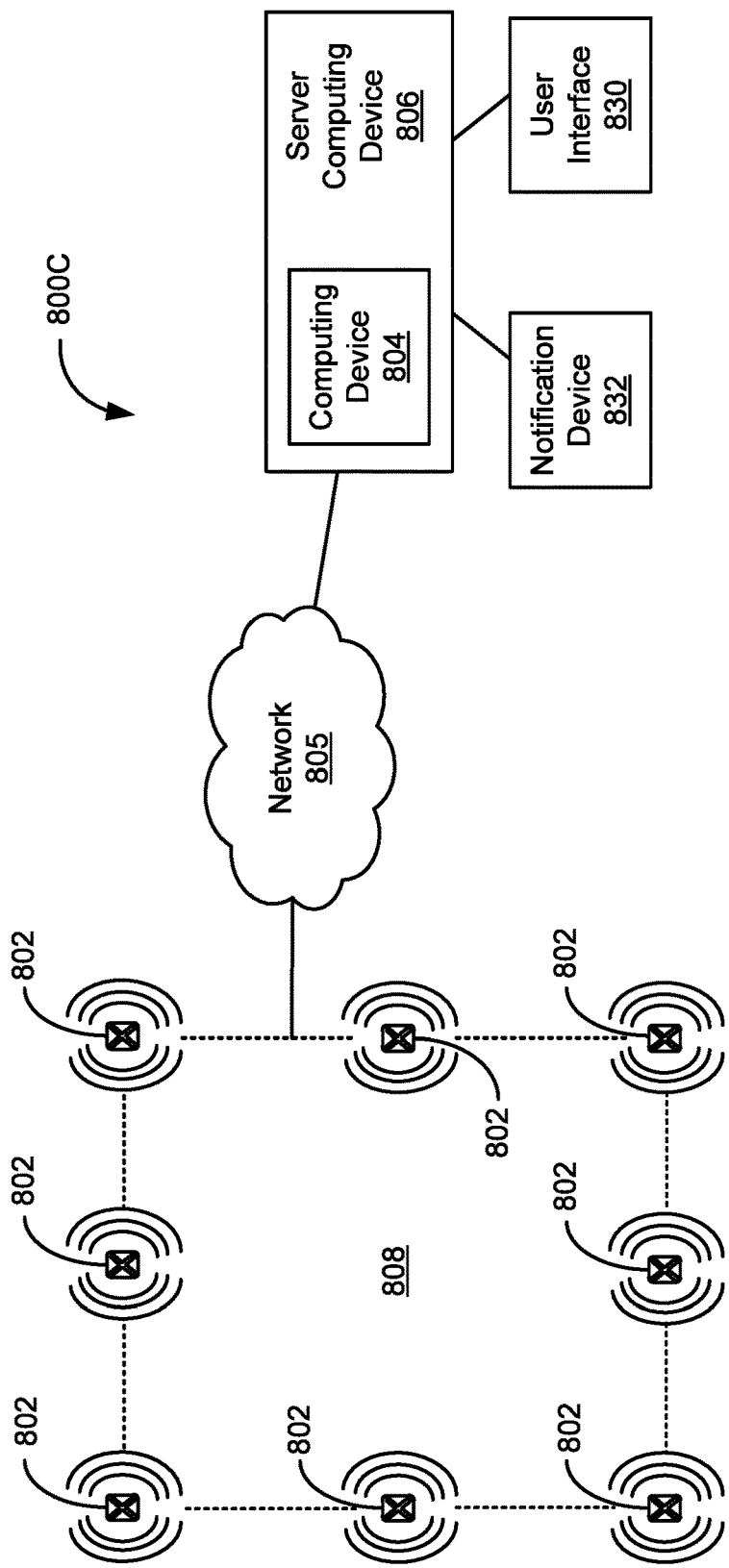

FIG. 8C illustrates another embodiment of a system 800c in which the client computing device 804 may be located remotely, and/or may be a component of a server computing device 806. The network 801 may pass measurements over a network 805 connection to a remote server computer 806.

The server may include or function as the client computing device 804, performing the calculations for detection and estimation, and then may send the alerts and other information to the notification device 834 and/or user interface 830.

Distributed Processing

Figure 8D:
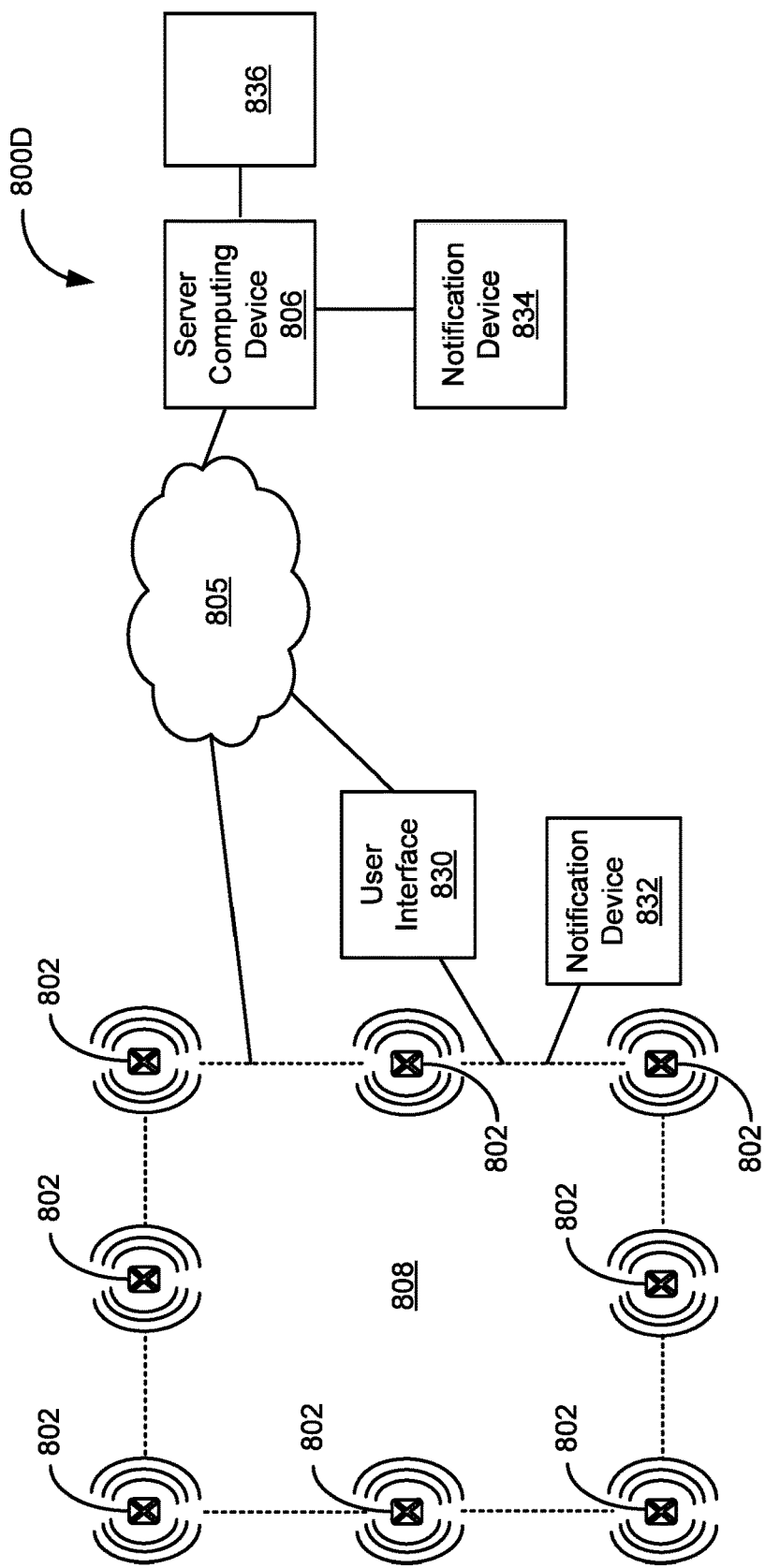

FIG. 8D illustrates still another embodiment of a system 800d in which the client computing device 804 may be removed by placing computational tasks on the sensing network nodes 802. As measurements are made, each node 802 may perform some calculations and share the results of the calculations with other nodes 802 in the network 801. Each node 802 may use the shared calculations to detect motion or presence or estimate other quantities. The detection and estimation results may be sent out of the sensing network 801 and directly to a server computing device 806, a user interface 830, or a notification device 832. The server computing device 806 may interact with a remote notification device 834 to provide additional notifications of motion or presence detection within the area of interest. A second user interface 836 may be accessible by a user to enable configuration of the server computing device 806.

Simple Detection Example

Figure 9A:
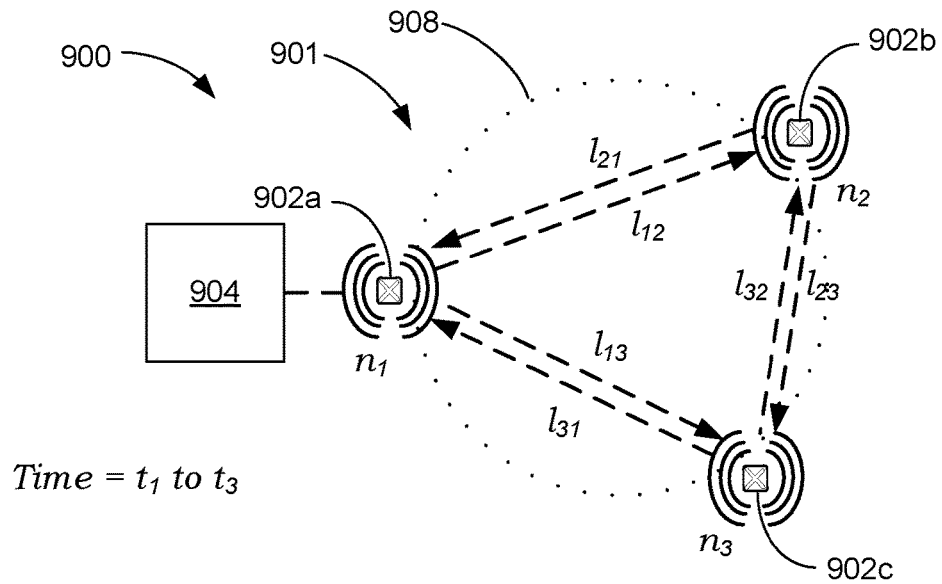
FIGS. 9A-9B illustrate one example embodiment of a system of device-free motion detection and presence detection, according to the present disclosure.
Figure 9B:
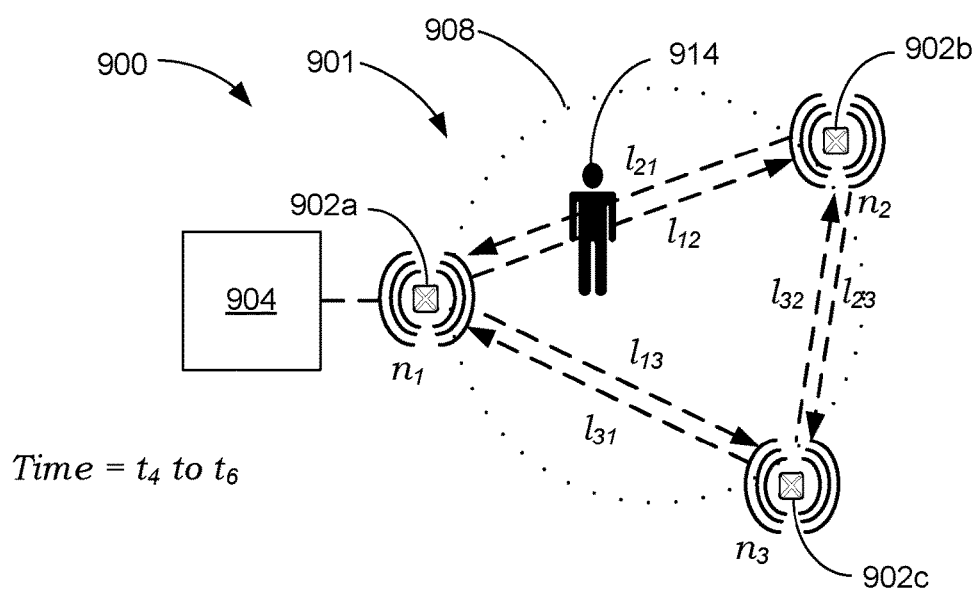

FIGS. 9A-9B depict a simple example of an embodiment of a system 900 of device-free motion detection and presence detection. The system 900 includes three wireless radios (nodes) 902, and specifically a first node $n_1$ 902a, a second node $n_2$ 902b, and a third node $n_3$ 902c. Node $n_1$ 902a is designated as the base station control 903 of the system 900. The system also includes a computing device 904. The nodes 902 are positioned around an area of interest 908 and configured in a mesh wireless network 901. In the illustrated embodiment, the node $n_1$ 902a is coupled with the computing device 904. The first node $n_1$ 902a receives data from all of the other nodes (i.e., node $n_2$ 902b and node $n_3$ 902c) and then communicates that data to the computing device 904, which then processes the data. As can be appreciated, the results of processing the data may be further communicated by the computing device 904 to another computing device (not shown). Moreover, in other embodiments, the computing device 904 may receive data from one or more of the nodes 902 wirelessly, rather than via a particular connected node.

The nodes 902 are linked to each other via a plurality of links each labeled in the format $l_{n1n2}$ (shown as lines linking one node to another). The links each represent the transmission of a wireless signal from one node 902 to another.

FIG. 9A is representative of times $t_1$ through $t_3$ and FIG. 9B is representative of times $t_4$ through $t_6$. At time $t_1$ the node schedule index k may be at 1, indicating it is the node $n_1$'s turn to transmit. Accordingly, the node $n_1$ 902a transmits a wireless signal to the nodes $n_2$ 902b and $n_3$ 902c. The node $n_2$ 902b is listening for a transmission and when it receives the transmission it measures the RSS of the link $l_{12}$. The RSS of link $l_{12}$ may be −30 dBm. The node $n_2$ 902b then updates its RSSI/LQI vector for the link $l_{12}$. Similarly, the node $n_3$ 902c is listening for a transmission and when it receives the transmission it measures the RSS of the link $l_{13}$, which may be −62 dBm. The node $n_3$ 902c then updates its RSSI/LQI vector for the link $l_{13}$. FIG. 10A depicts the RSSI/LQI vector of nodes $n_1$, $n_2$, and $n_3$ at time $t_1$.

The node $n_1$ 902a may transmit data with the transmitted wireless signal to the nodes $n_2$ 902b and $n_3$ 902c. For example, in the illustrated embodiment the node $n_1$ 902a may transmit the values of its RSSI/LQI vector. The RSSI/LQI vector of node $n_1$ is empty at time $t_1$, so a default value such as "0" may be transmitted. The base station control 903, in this case node $n_1$, can receive the RSSI/LQI vector data with the transmission broadcast by each node 902 and pass that information along to the computing device 904. In the illustrated embodiment the first node $n_1$ 902a may be the base station control 903 and, thus, may not receive or process data transmitted from itself. The receiving nodes (e.g., nodes $n_2$ 902b and $n_3$ 902c) may not be concerned with the data, because the focus may be on merely the strength of the signal. In some embodiments, none of the nodes 902 may be concerned with any transmitted data, and accordingly the content of the transmission may be unimportant. By contrast, in other embodiments, such as the illustrated embodiment, one or more of the nodes 902 or other devices may receive and process data sent as part of the transmission. Thus, it may be useful to transmit data with the signal.

Each node may advance the schedule individually based on the transmitting node ID of incoming received packets. For example, upon receiving a packet from the first node $n_1$ 902a, the second node $n_2$ 902b may increment its own schedule to 2 (i.e., k=2). Similarly, the third node $n_3$ 902c may also increment its own schedule to 2 (i.e., k=2) when it receives a packet from the first node $n_1$ 902a. The network stays synchronized because even if a node misses a transmission from another node, the schedule will automatically correct itself on the next successful received packet. The first node $n_1$ 902a does not receive a packet when it is transmitting, and accordingly its schedule may remain at 1 (i.e., k=1) until a packet is received from another node, at which time the schedule can be updated, as will be described below.

At time $t_2$ the node schedule index k is now 2, indicating it is the second node $n_2$'s 902b turn to transmit. Accordingly, the second node $n_2$ 902b transmits a wireless signal to the nodes $n_1$ 902a and $n_3$ 902c. The first node $n_1$ 902a is listening for a transmission and when it receives the transmission it measures the RSS of the link $l_{21}$, which may be −31 dBm. The node $n_1$ 902a then updates its RSSI/LQI vector for the link $l_{21}$. Similarly, the node $n_3$ 902c is listening for a transmission and when it receives the transmission it measures the RSS of the link $l_{23}$, which may be −66 dBm. The node $n_3$ 902c then updates its RSSI/LQI vector for the link $l_{23}$. FIG. 10B depicts the RSSI/LQI vector of nodes $n_1$, $n_2$, and $n_3$ at time $t_2$.

In the illustrated embodiment, the transmission of the second node $n_2$ 902b may include the contents of the RSSI/LQI vector of the node $n_2$ 902b. In the illustrated circumstances, the data would indicate that the last recorded measurement for link $l_{12}$ was −30 dBm and that no value has been recorded for link $l_{32}$. The base station control 903 (e.g., node $n_1$ 902a) can gather that data and communicate it to the computing device 904 for use in the calculation of Q (see equations 1 and 2 above).

At time $t_3$ the node schedule index k is 3, indicating it is the node $n_3$'s 902c turn to transmit. Accordingly, the node $n_3$ 902c transmits a wireless signal to the nodes $n_1$ 902a and $n_2$ 902b. The node $n_1$ 902a is listening for a transmission and when it receives the transmission it measures the RSS of the link $l_{31}$, which may be −60 dBm. The node $n_1$ 902a then updates its RSSI/LQI vector for the link $l_{31}$. Similarly, the node $n_2$ 902b is listening for a transmission and when it receives the transmission it measures the RSS of the link $l_{32}$, which may be −65 dBm. The node $n_2$ 902b then updates its RSSI/LQI vector for the link $l_{32}$. FIG. 10B depicts the RSSI/LQI vector of nodes $n_1$, $n_2$, and $n_3$ at time $t_3$.

In the illustrated embodiment, the transmission of the third node $n_3$ 902c may include the contents of the RSSI/LQI vector of the node $n_3$ 902c. In this case the data would indicate that the last recorded measurement for link $l_{13}$ was −62 dBm and the last recorded measurement for link $l_{23}$ was −66 dBm. A base station control (in the illustrated embodiment node $n_1$ 902a) can gather that data and communicate it to the computing device for use in the calculation of Q (see equations 1 and 2 above).

The base station control can organize the received measurements over time and store them in data buffers for processing. For example, the last 10 measurements of each link can be saved, and the variance of these 10 samples can be computed for each link. The variances would then be summed to form the total aggregate disturbance score Q, which may be used for detection and estimation. As can be appreciated, a calculation other than variance can be used for the link and aggregate disturbance.

FIG. 9B illustrates a person 914 entering the area of interest 908. When the person 914 or other object enters the network area the signal strength measurements may be disturbed. In heavily obstructed areas, the signal strength may either increase or decrease, depending on the location of the person 914 entering and on the propagation path of the link. As another round of token passing occurs, the signal strength changes are updated in the RSSI/LQI vectors of each of the nodes. FIGS. 10D-10F depict the RSSI/LQI vector of nodes $n_1$, $n_2$, and $n_3$ at time $t_4$ through $t_6$, respectively, showing how the signal strength measurements may change. Again, these measurements are received by the base station control and organized over time and used to compute the variances for each link. The variances can then be used to calculate Q, which is used for detection and estimation.

At time $t_4$ the node schedule index k may be at 1, indicating it is the node $n_1$'s turn to transmit. Accordingly, the node $n_1$ 902a again transmits a wireless signal to the nodes $n_2$ 902b and $n_3$ 902c. The node $n_2$ 902b is listening for a transmission and when it receives the transmission it measures the RSS of the link $l_{12}$. The RSS of link $l_{12}$ may be −25 dBm. The node $n_2$ 902b then updates its RSSI/LQI vector for the link $l_{12}$. Similarly, the node $n_3$ 902c is listening for a transmission and when it receives the transmission it measures the RSS of the link $l_{13}$, which may be −68 dBm. The node $n_3$ 902c then updates its RSSI/LQI vector for the link $l_{13}$. FIG. 10D depicts the RSSI/LQI vector of nodes $n_1$, $n_2$, and $n_3$ at time $t_4$. The change in the RSS of link $l_{12}$ and link $l_{13}$ from time $t_1$ to time $t_4$ may be due to the disturbance caused by the person 914 entering the area of interest 908.

In the illustrated embodiment, the transmission of the first node $n_1$ 902a may transmit the values of its RSSI/LQI vector with the transmitted wireless signal to the nodes $n_2$ 902b and $n_3$ 902c. In the illustrated circumstances, the data would indicate that the last recorded measurement for link $l_{21}$ was −31 dBm and that the last recorded measurement for link $l_{31}$ was −60 dBm. Because node $n_1$ 902a is the base station control 903, it may, alternatively or in addition, communicate the values of its RSSI/LQI vector to the computing device 904 for use in the calculation of Q (see equations 1 and 2 above).

At time $t_5$ the node schedule index k is now 2, indicating it is again the second node $n_2$'s 902b turn to transmit. Accordingly, the second node $n_2$ 902b transmits a wireless signal to the nodes $n_1$ 902a and $n_3$ 902c. The first node $n_1$ 902a is listening for a transmission and when it receives the transmission it measures the RSS of the link $l_{21}$, which may be −26 dBm. The node $n_1$ 902a then updates its RSSI/LQI vector for the link $l_{21}$. Similarly, the node $n_3$ 902c is listening for a transmission and when it receives the transmission it measures the RSS of the link $l_{23}$, which may be −77 dBm. The node $n_3$ 902c then updates its RSSI/LQI vector for the link $l_{23}$. FIG. 10E depicts the RSSI/LQI vector of nodes $n_1$, $n_2$, and $n_3$ at time $t_5$. The change in the RSS of link $l_{21}$ and link $l_{23}$ from time $t_2$ to time $t_5$ may be due to the disturbance caused by the person 914 entering the area of interest 908.

In the illustrated embodiment, the transmission of the second node $n_2$ 902b may include the contents of the RSSI/LQI vector of the node $n_2$ 902b. In the illustrated circumstances, the data would indicate that the last recorded measurement for link $l_{12}$ was −25 dBm and that the last recorded measurement for link $l_{32}$ was −65 dBm. The base station control 903 (e.g., node $n_1$ 902a) can gather that data and communicate it to the computing device 904 for use in the calculation of Q (see equations 1 and 2 above).

At time $t_6$ the node schedule index k is 3, indicating it is again the node $n_3$'s 902c turn to transmit. Accordingly, the node $n_3$ 902c transmits a wireless signal to the nodes $n_1$ 902a and $n_2$ 902b. The node $n_1$ 902a is listening for a transmission and when it receives the transmission it measures the RSS of the link $l_{31}$, which may be −69 dBm. The node $n_1$ 902a then updates its RSSI/LQI vector for the link $l_{31}$. Similarly, the node $n_2$ 902b is listening for a transmission and when it receives the transmission it measures the RSS of the link $l_{32}$, which may be −75 dBm. The node $n_2$ 902b then updates its RSSI/LQI vector for the link $l_{32}$. FIG. 10B depicts the RSSI/LQI vector of nodes $n_1$, $n_2$, and $n_3$ at time $t_6$. The change in the RSS of link $l_{31}$ and link $l_{32}$ from time $t_3$ to time $t_6$ may be due to the disturbance caused by the person 914 entering the area of interest 908.

In the illustrated embodiment, the transmission of the third node $n_3$ 902c may include the contents of the RSSI/LQI vector of the node $n_3$ 902c. In this case the data would indicate that the last recorded measurement for link $l_{13}$ was −68 dBm and the last recorded measurement for link $l_{23}$ was −77 dBm. The base station control 903 (in the illustrated embodiment node $n_1$ 902a) can gather that data and communicate it to the computing device for use in the calculation of Q (see equations 1 and 2 above).

The base station control 903 can receive the measurements, organize the received measurements over time, and store in data buffers for later processing and/or used to compute the variances for each link. The variances can then be used to calculate Q, which is used for detection and estimation. The change in Q, for example at time $t_6$ as compared to time $t_3$ may indicate the disturbance and the system can send a notification or otherwise provide an alert of the detected disturbance.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art appreciates that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

It will be understood by those having skill in the art that many changes may be made to the details of the above-described embodiments without departing from the underlying principles of the invention. The scope of the present invention should, therefore, be determined by the following claims.

What is claimed is:

1. A node to form a wireless network to detect one or more of presence, motion, location, speed, and velocity of an object within an area of interest, the node comprising:
   a transceiver to transmit wireless signals to one or more other nodes of the wireless network arranged about an area of interest and to receive wireless signals from the one or more other nodes of the wireless network;
   a signal strength detector to measure a strength of the wireless signals received from each of the one or more other nodes of the wireless network; and
   one or more processors to collect from the signal strength detector a set of signal strength values each for the measured strength of the wireless signals received from a given node of the one or more other nodes of the wireless network and communicate the set of signal strength values to a processing unit that processes the set of signal strength values to infer one or more of presence, motion, location, speed, and velocity of an object within an area of interest, wherein the object is distinct from the node and from the wireless network.

2. The node of claim 1, wherein the one or more processors communicate the set of signal strength values to the processing unit via transmission of the wireless signals by the transceiver.

3. The node of claim 1, wherein transmission of wireless signals to each node of the one or more other nodes and corresponding receipt of wireless signals from each node forms a link, and wherein the signal strength detector determines a link quality indicator (LQI) to communicate to the processing unit.

4. The node of claim 1, wherein the signal strength detector determines a received signal strength indicator (RSSI) to communicate to the processing unit.

5. The node of claim 1, wherein the processing unit is a base station control node that is another node of the wireless network.

6. The node of claim 1, wherein the processing unit is a computing device external to the wireless network.

7. The node of claim 1, further comprising a memory to store the set of signal strength values for communication to the processing unit.

8. The node of claim 7, wherein the memory stores the signal strength value in an array data structure having a number of elements corresponding to the number of nodes of the wireless network.

9. The node of claim 8, wherein the array data structure comprises a vector data structure having a dynamic size that can grow as nodes are added to the wireless network and shrink as nodes are removed from the wireless network.

10. The node of claim 1, to operate as a base station control node to:

receive from each given node of the one or more other nodes of the wireless network a set of signal strength values stored by the given node; and communicate the set of signal strength values to the processing unit.

11. The node of claim 1, the transceiver further to receive a join beacon, after which the transceiver temporarily halts transmission of wireless signals to facilitate a new node automatically being joined to the wireless network, wherein the transceiver is to resume transmitting wireless signals to the new node and to receive wireless signals from the new node and the signal strength detector to measure a strength of the wireless signals received from the new node.

12. The node of claim 1, the transceiver configured to receive a join beacon and to transmit a join request to join the wireless network.

13. A base station control node of a wireless network to detect one or more of presence, motion, location, speed, and velocity of an object within an area of interest, the base station control node comprising:

a memory to store sets of signal strength values for communication to a processing unit, each set of signal strength values corresponding to a given node of a plurality of nodes of the wireless network arranged around the area of interest;

one or more processors to:
write to the memory the sets of signal strength values; and communicate the sets of signal strength values to a processing unit that processes the sets of signal strength values to infer one or more of presence, motion, location, speed, and velocity of an object within the area of interest, wherein the object is distinct from the node and from the wireless network; and a transceiver to receive wireless signals from each of the plurality of nodes of the wireless network, the wireless signals including the sets of signal strength values.

14. The base station control node of claim 13, wherein the plurality of nodes of the wireless network includes the base station control node, wherein the transceiver is further to transmit wireless signals to one or more other nodes of the plurality of nodes of the wireless network, such that the one or more other nodes can measure a strength of the wireless signals transmitted by the base station control node, the base station control node further comprising:

a signal strength detector to measure a strength of the wireless signals received from each of the one or more other nodes of the wireless network and communicate measurements to the one or more processors to write to the memory a set of signal strength values corresponding to the base station control node.

15. The base station control node of claim 13, the transceiver configured to transmit a join beacon and to await and receive a join request from a new node to facilitate the new node joining the wireless network.

16. The base station control node of claim 13, wherein the processing unit comprises a local computing device at a location of the base station control node.

17. The base station control node of claim 13, wherein the processing unit comprises a remote computing device at a location remote from the base station control node and in communication with the base station control node via a communication network.

18. A node to form a wireless network to detect one or more of presence, motion, location, speed, and velocity of an object within an area of interest, the node comprising:

a transceiver to transmit wireless signals to one or more other nodes of the wireless network arranged about an area of interest and to receive wireless signals from the one or more other nodes of the wireless network;

a detector to measure a measureable characteristic of the wireless signals received from each of the one or more other nodes of the wireless network; and one or more processors to:
write to memory a set of one or more values each for the measurable characteristic of the wireless signals received from a corresponding node of the one or more other nodes; and communicate the set of one or more values to a processing unit that processes a plurality of sets of values to infer one or more of presence, motion, location, speed, and velocity of an object within an area of interest, wherein the object is distinct from the node and from the wireless network, each set of the plurality of sets of values corresponding to a node of the wireless network.

19. The node of claim 18, wherein the one or more processors communicate the set of one or more values to the processing unit via transmission of the wireless signals by the transceiver.

20. The node of claim 18, wherein the sets of values comprise one or more of a received signal strength indicator (RSSI) and a link quality indicator (LQI).

* * * * *